US006993350B2

(12) United States Patent
Katoh

(10) Patent No.: US 6,993,350 B2
(45) Date of Patent: Jan. 31, 2006

(54) NAVIGATION SYSTEM USING MOBILE TERMINAL

(75) Inventor: Satoshi Katoh, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 10/157,991

(22) Filed: May 31, 2002

(65) Prior Publication Data
US 2003/0008670 A1 Jan. 9, 2003

(30) Foreign Application Priority Data
May 31, 2001 (JP) ............................. 2001-164396

(51) Int. Cl.
H04Q 7/20 (2006.01)
(52) U.S. Cl. ................. 455/457; 455/456.1; 455/456.2; 455/456.3
(58) Field of Classification Search ................ 455/457, 455/456.1, 456.2, 456.3, 466
See application file for complete search history.

(56) References Cited

U.S. PATENT DOCUMENTS

| 6,115,611 | A  | * | 9/2000  | Kimoto et al. ........... 455/456.3 |
| 6,314,295 | B1 | * | 11/2001 | Kawamoto ............... 455/456.2 |
| 6,330,453 | B1 | * | 12/2001 | Suzuki et al. ............... 455/457 |
| 6,714,859 | B2 | * | 3/2004  | Jones .......................... 701/201 |
| 2003/0008670 | A1 | * | 1/2003 | Katoh ........................ 455/456 |
| 2003/0060211 | A1 | * | 3/2003 | Chern et al. ................ 455/456 |

FOREIGN PATENT DOCUMENTS

| GB | 2 346 697 A  | 8/2000  |
| WO | 98/45823     | 10/1998 |
| WO | 00/49530     | 8/2000  |
| WO | 01/13069 A1  | 2/2001  |
| WO | 01/69570 A2  | 9/2001  |

* cited by examiner

Primary Examiner—Joseph Feild
Assistant Examiner—Huy D. Nguyen
(74) Attorney, Agent, or Firm—Young & Thompson

(57) ABSTRACT

A mobile terminal such as a portable telephone accesses a map database server connected to the Internet, and positional data, destination, etc. acquired from a GPS receiver mounted on the mobile terminal are cataloged in the map database server. The results of a search for a route, route indication, etc. are received from the map database server in the form of a voice, a simplified map, or both a voice and a simplified map and are indicated on a display of the mobile terminal. By virtue of the above construction, a navigation system can be realized which can eliminate the need to update map data, is low in price, has no need to provide an installation space, has low power consumption, and can be simply and easily utilized.

14 Claims, 9 Drawing Sheets

NAVIGATION SYSTEM USING MOBILE TERMINAL

FIELD OF THE INVENTION

The invention relates to a navigation system using a mobile terminal such as a portable telephone (cellular phone).

BACKGROUND OF THE INVENTION

In recent years, a car navigation system has spread wherein positional information of a moving vehicle is acquired, for example, by radio waves from an artificial satellite or self-contained navigation and, based on the positional information, for example, map information data, the current position of the vehicle, and a recommendation route to a destination are displayed on a real-time basis.

In utilizing the above car navigation system, however, an expensive device for the car navigation system should be purchased and mounted on the vehicle, and electric wiring should then be carried out. In recent years, an easily removable portable device is on the market. The easily removable portable device, however, cannot be easily purchased by consumers for cost reasons and further requires to ensure a space for mounting the device. In addition, the conventional car navigation system has a problem that the power consumption of the device body is so large that a large burden is imposed on the battery of the vehicle.

Furthermore, in the above car navigation system, the map data is generally supplied in the form of a recording medium such as CD-ROM. Therefore, in order to always use the latest road information which changes momentarily, a recording medium such as CD-ROM, in which the latest map information has been recorded, should be purchased as occasion demands. Therefore, not only the device body cost but also the cost for updating the map information as occasion demands incurs, and, in addition, this involves troublesome work such as updating to the latest map data.

To overcome these problems, a car navigation device, for example, as shown in FIG. 1 has been proposed which reads the latest map data from a predetermined map database through a predetermined transmission medium. FIG. 1 shows a car navigation system described in Japanese Patent Laid-Open No. 255022/1998. This car navigation device is an example of the construction of an information provision system which supplies map data to a car navigation device 7 mounted on a vehicle 8.

In this information provision system, a map data base server 1 storing map data is connected to the Internet 2, and a provider 3, which performs a service of connection to the Internet 2 to users who utilize a public telephone network (a telephone line) 4, is connected to the Internet 2 and the public telephone network (telephone line) 4. A portable telephone base station 5 connected to the public telephone network 4 performs communication with a portable telephone 6 using radio waves as the transmission medium.

In the above construction, the map data, together with the date on which the map data is cataloged in the database, is stored in the database. Further, in the car navigation device 7, the map data, together with date data corresponding to the map data, is stored. The date data in the database is compared with the date data in the car navigation device 7. Based on the results of comparison, the map data and date data in the car navigation device 7 are respectively updated using the map data and date data in the database to update the old map data to new map data.

The conventional car navigation system, however, involves a problem that, even when the update of only old map data is contemplated, an operation for comparison of the date data to update the map is necessary.

Further, the price is high, a space for installation should be provided, and, in addition, the power consumption is large. Due to these disadvantages, the conventional car navigation system has not been extensively utilized.

SUMMARY OF THE INVENTION

Accordingly, it is an object of the invention to provide a navigation system which unnecessitates the operation for the update of map data, is inexpensive, and can eliminate the need to provide any installation space, has small power consumption, and can be simply utilized.

According to the first feature of the invention, there is provided a navigation system using a mobile terminal held by a movable body such as a person ridden in a vehicle, a walker or the like, map data stored in a server on the Internet being loaded into the mobile terminal to display a moving route of the movable body on the mobile terminal, said navigation system comprising: a first memory provided in the mobile terminal, for storing the loaded map data of the server; a display provided in the mobile terminal, for displaying the map data, stored in the first memory, in the form of a voice and/or an image or the like; a first control unit provided in the mobile terminal, for sending the identification number, current position, and destination of the movable body to the server; a second memory provided in the server, for storing the map data; and a second control unit provided in the server, for, upon the input of the identification number, the current position, and the destination of the movable body through the first control unit, reading map data containing the current position and the destination from the second memory and, based on the identification number, sending the map data to the mobile terminal.

In the navigation system, preferably, Internet reading means is built in the mobile terminal and the mobile terminal utilizes the Internet reading means to indicate the map data, sent from the server, on the display.

In the navigation system, preferably, the mobile terminal acquires information on the current position through a GPS (global positioning system) receiver and sends the information on the current position from the first control unit to the server every time when a predetermined period of time has elapsed or every time when the mobile terminal has moved by a predetermined distance.

In the navigation system, preferably, upon the receipt of a request for search for a route from the mobile terminal, the server makes a search for a recommendation route from the current position to the destination and stores the map data, which has been found as the result of the search, in the second memory through the second control unit and further sends the map data to the mobile terminal.

In the navigation system, preferably, upon the receipt of information on the current position from the mobile terminal every time when a predetermined period of time has elapsed or every time when the mobile terminal has moved by a predetermined distance, the server compares, through the second control unit, the current position with the position of the mobile terminal stored in the second memory for each predetermined time or each predetermined distance to judge whether or not the mobile terminal has moved according to the recommendation route stored in the second memory and, every time when the mobile terminal has arrived at a predetermined point, sends map data containing a route, through which the mobile terminal is to be traveled, from the second control unit to the mobile terminal.

In the navigation system, preferably, the predetermined point is the time when the mobile terminal has approached a branching point such as an intersection or a junction of three roads, the time when the mobile terminal has moved by a predetermined period of time, or the time when the mobile terminal has moved by a predetermined distance.

In the navigation system, preferably, upon the receipt of information on the current position from the mobile terminal every time when a predetermined period of time has elapsed or every time when the mobile terminal has moved by a predetermined distance, the server compares, through the second control unit, the current position with the positions of the mobile terminal stored in the second memory for each predetermined time or each predetermined distance and, as a result, when the route of the mobile terminal has been found to be in the state of deviation from the recommendation route stored in the second memory, the server makes again a search for a recommendation route from the current position to the destination, stores the map data in the second memory through the second control unit and further sends the map data to the mobile terminal.

In the navigation system, preferably, upon the receipt of information on the current position from the mobile terminal every time when a predetermined period of time has elapsed or every time when the mobile terminal has moved by a predetermined distance, the server compares, through the second control unit, the current position with the position of the destination stored in the second memory for each predetermined time or each predetermined distance and, when the current position corresponds to the position of the destination stored in the second memory, the server informs the mobile terminal of the arrival of the mobile terminal at the destination stored in the second memory through a voice, an image, or both a voice and an image.

In the navigation system, preferably, upon the receipt of information on the current position from the mobile terminal every time when a predetermined period of time has elapsed or every time when the mobile terminal has moved by a predetermined distance, the server compares, through the second control unit, the current position with the original position or predetermined position of the mobile terminal stored in the second memory for each predetermined time or each predetermined distance, calculates travel information such as the time required in travel, the travel distance, and the average speed between the original position or the predetermined position, stored in the second memory, and the current position, stores the travel information in the second memory, and further sends map data, containing an area ranging from the original position or the predetermined position to the destination, to the mobile terminal.

In the navigation system, preferably, the map data in the server contains information on town including stores and institutions around the current position.

In the navigation system, preferably, the town information is obtained by displaying a predetermined link destination on the display of the mobile terminal and selecting the link destination or by inputting a predetermined address through key operation to connect the mobile terminal to a database server or a home page other than the server connected to the Internet.

In the navigation system, preferably, the map data sent from the second control unit to the mobile terminal comprises a voice, an image, or both a voice and an image.

In the navigation system, preferably, the server periodically updates the map data stored in the second memory.

In the navigation system, preferably, upon the receipt of a request from the mobile terminal as a first mobile terminal for the display of the position of another mobile terminal as a second mobile terminal in the map data being currently displayed, the server searches the second memory for the positional information of the second mobile terminal and, when information on the second mobile terminal has been found to be stored in the second memory, the server informs the second mobile terminal of that the first mobile terminal has requested the display of the position of the second mobile terminal in the map data being currently displayed and, upon the receipt of the permission to display the position of the second mobile terminal, the server reads, from the second memory, map data comprising positional data of the second mobile terminal added to the map data being currently indicated on the display of the first mobile terminal, sends the read map data to the first mobile terminal, and, in addition, sends, to the second mobile terminal, the same map data as sent to the first mobile terminal through the second control unit of the server.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

Figure 1:
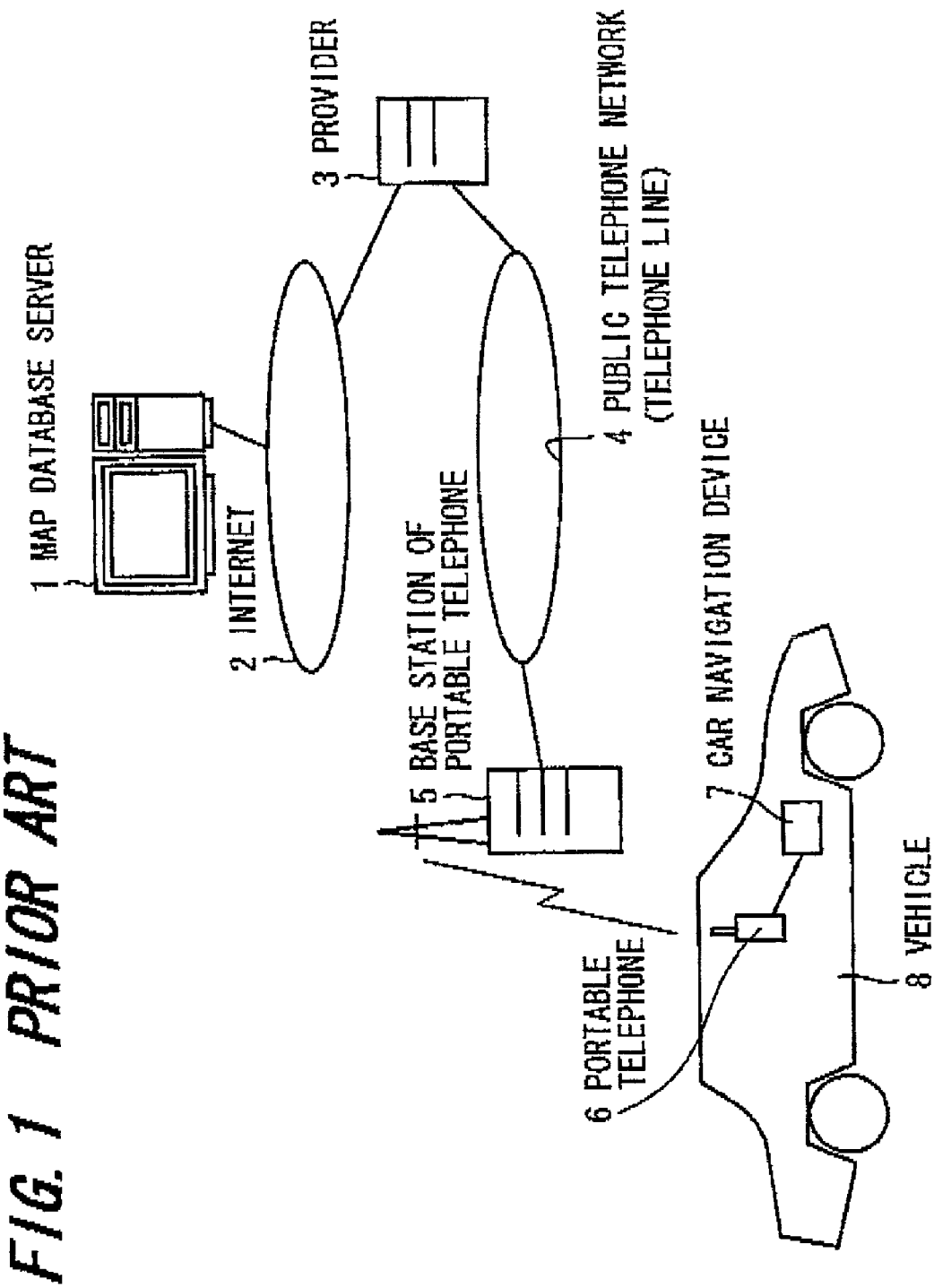
FIG. 1 is a diagram showing an example of the construction of the conventional car navigation system.
Figure 2:
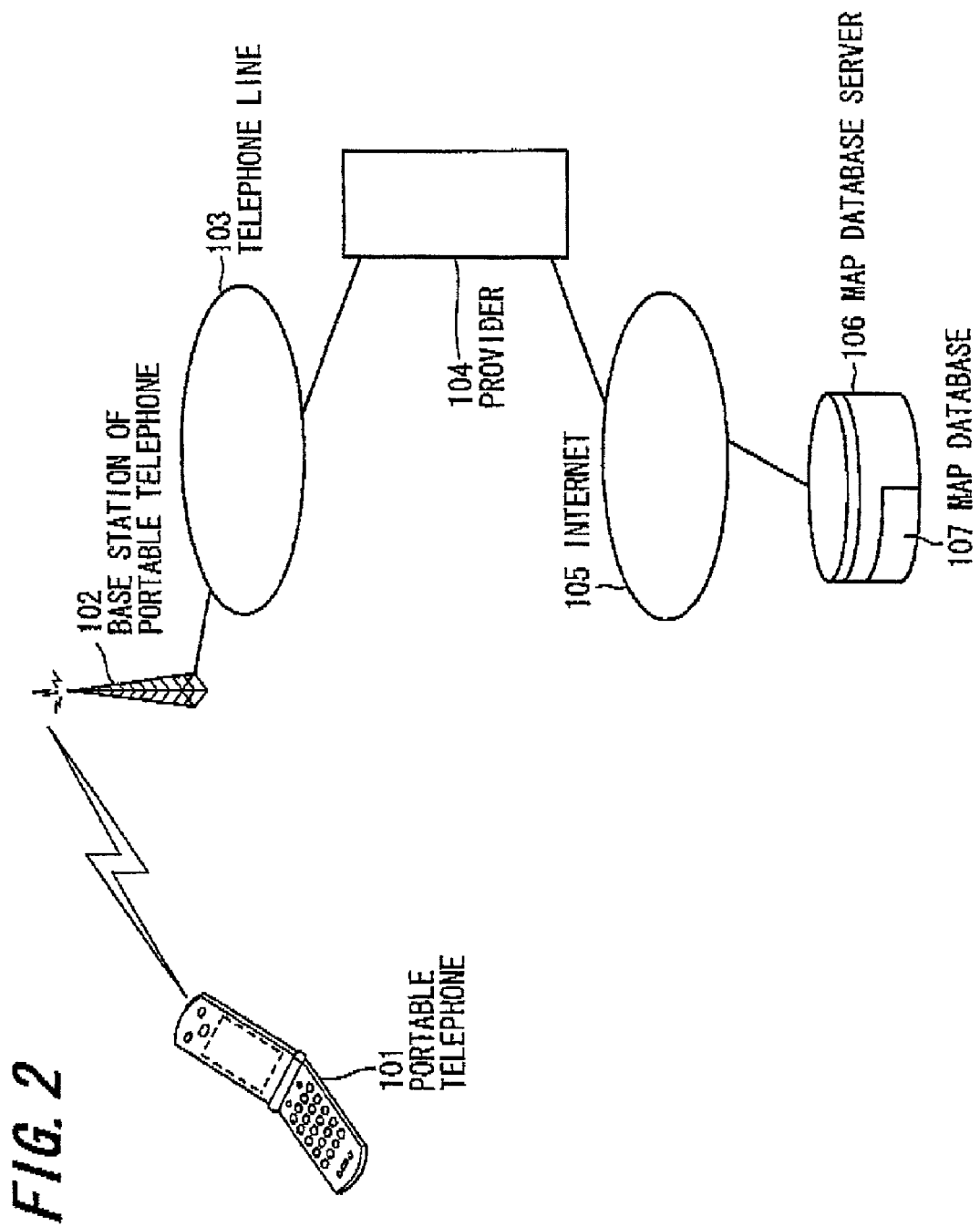
FIG. 2 is a diagram showing a preferred embodiment of the construction of the navigation system using a mobile terminal according to the invention.

FIG. 2 shows a preferred embodiment of the construction of the navigation system using a mobile terminal according to the invention.

The navigation system using a mobile terminal according to the preferred embodiment of the invention comprises: a portable telephone 101 as a mobile terminal; a portable telephone base station 102 for performing voice signal/data communication with the portable telephone through radio waves; a provider 104 connected to the portable telephone base station 102 through a public telephone network 103; and a map database server 106 connected to the Internet 105.

The portable telephone 101 has a function as a conventional telephone and, in addition, is provided with a GPS (global positioning system) receiver for acquiring accurate positional information. An Internet reading software for access to the map database server 106 is also mounted.

Figure 3:
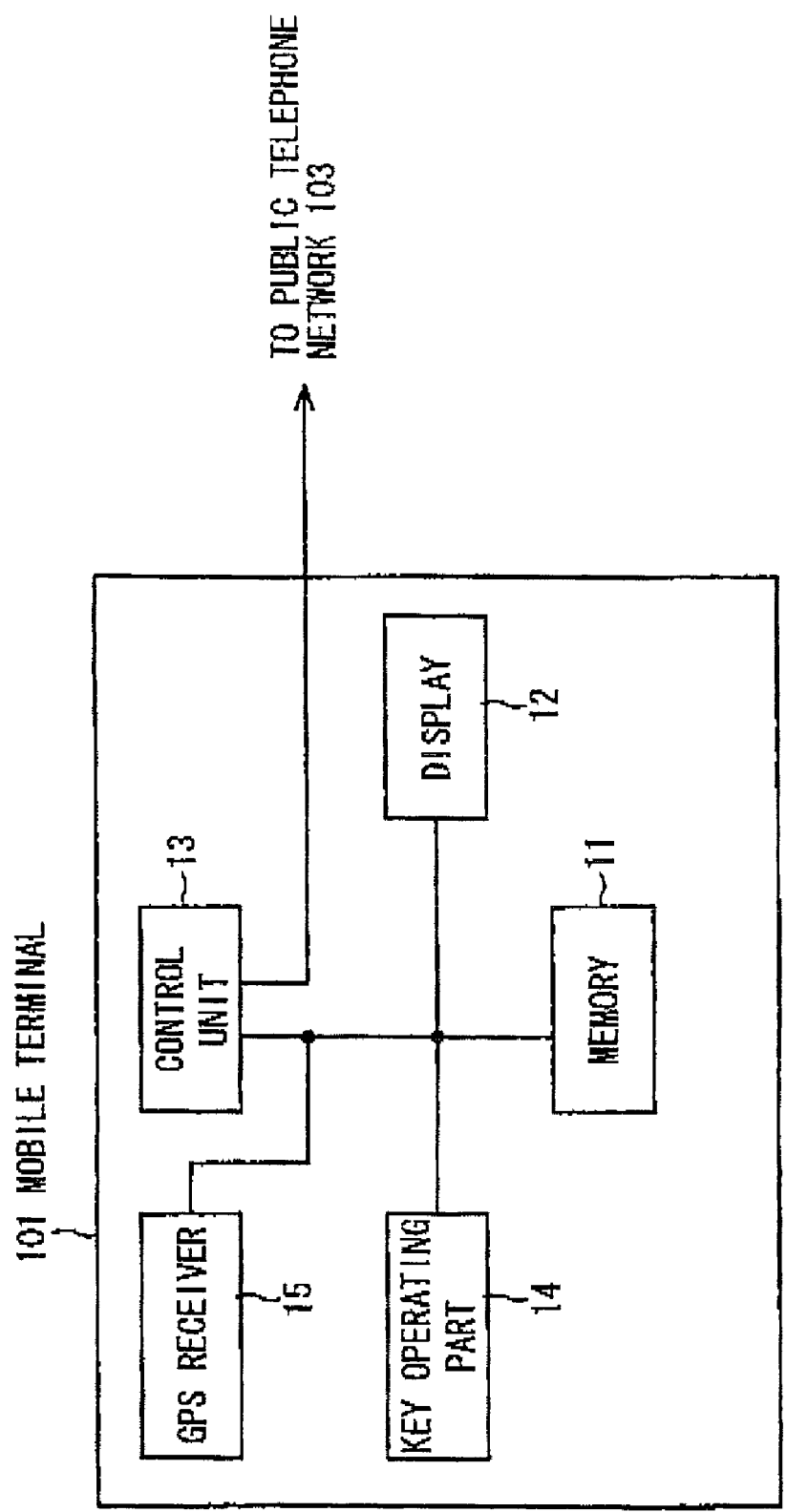
FIG. 3 is a conceptual diagram showing the construction of a mobile terminal.

FIG. 3 shows a mobile terminal 101. The mobile terminal 101 comprises: a memory 11 for storing loaded map data of the map database server 106; a display 12 for displaying map data in the memory 11 through voices, images, etc.; a control unit 13 for sending, for example, identification number and current position of the portable terminal to the map database server 106; a key operating part 14 for inputting, for example, letters of the destination or the like; and a GPS receiver 15. The display 12 can indicate both voices and images. Voices are output from a speaker, and images are output on a display screen.

The portable telephone base station 102 functions to communicate with the portable telephone 101 through radio waves and is connected to the public telephone network 103.

The provider 104 is connected to the Internet 105 through the public telephone network 103 and provides a service of connection of the public telephone network 103 and the Internet 105 to users of the public telephone network 103.

Figure 4:
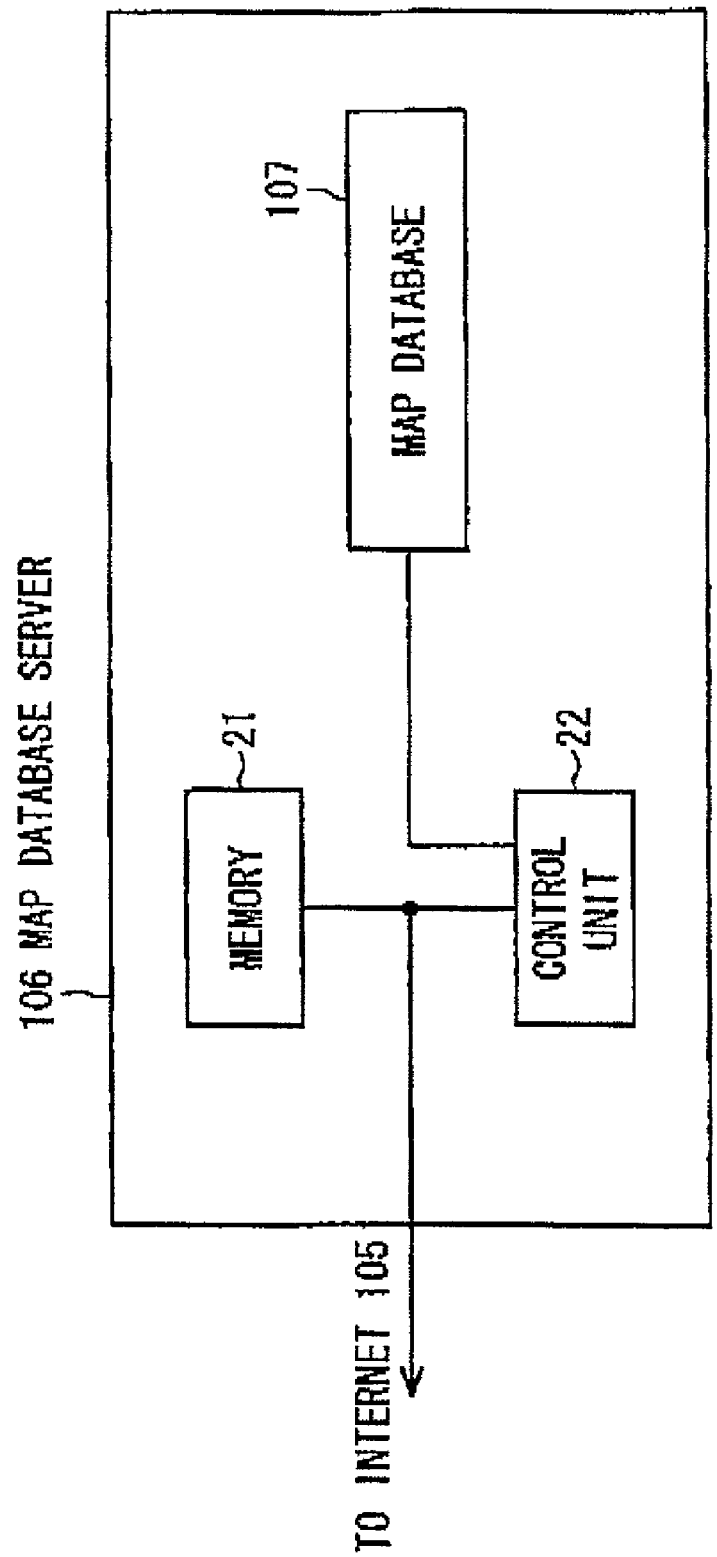
FIG. 4 is a conceptual diagram showing the construction of a map database server.

FIG. 4 shows a map database server 106. The map database server 106 is connected onto the Internet 105, and map information is stored in a map database 107 in the server. The map database server 106 comprises; a memory 21 for recording user's address (telephone number or inherent identification label of the portable telephone 101); and a control unit 22 which functions, for example, to make a search for the position of the mobile terminal 101, i.e., to acquire positional information, to catalog the destination, to search for the route, and to automatically inform the mobile terminal or the like of data, i.e., to automatically send data.

Figure 5:
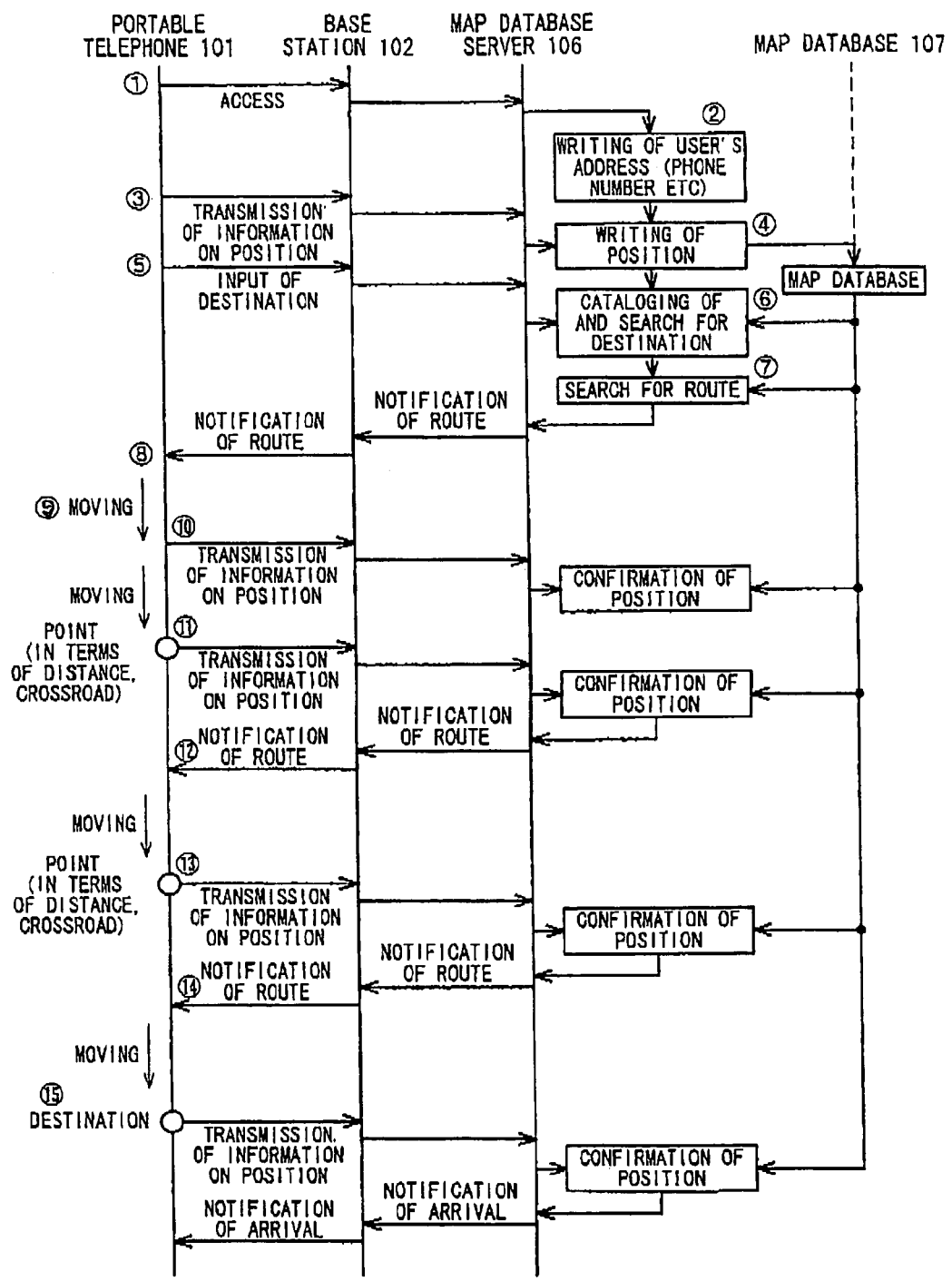
FIG. 5 is a diagram illustrating the operation of a first preferred embodiment of the invention.

The operation of the first preferred embodiment of the invention will be explained in conjunction with FIG. 5.

A person (user), who wishes to utilize the navigation system according to the invention, first utilizes the Internet reading software loaded on the portable telephone 101 to gain access from the portable telephone 101 as the mobile terminal to the map database server 106 through the base station 102 (step 1).

Upon the receipt of the request for the start of service through the base station 102, the public telephone network 103, and the provider 104, the map database server 106 records the transmitted user's address (telephone number or inherent identification label of the portable telephone 101) on a recording medium, for example, a hard disk, within the map database server 106 (step 2).

Subsequently, positional information (latitude and longitude) is sent from the GPS receiver built in the portable telephone 101 to the map database server 106 (step 3). The map database server 106 records the information and accesses the map database 107 to grasp the current position of the user (portable telephone 101) (step 4).

Next, the user sends information on destination in a predetermined format, for example, code number, telephone number of the destination, or address (step 5).

The map database server 106 records the received information on the destination, searches the map database 107 for the destination (step 6), and, based on the user's (portable telephone 101) current position and destination, searches the map database 107 for a recommendation route (step 7) and informs the user (portable telephone 101) of the result, for example, through a voice (step 8).

Subsequently, as soon as the user (portable telephone 101) starts to move (step 9), the positional information is successively acquired by the GPS receiver built in the portable telephone 101 and the map database server 106 is informed of the positional information every time when the user has moved by a predetermined time or distance (step 10). At that time, rather than the transmission of the positional information by the portable telephone through connection to the line, the addition of the positional information to an identification signal, which is automatically sent by the portable telephone, can offer an advantage that this signal is received, for example, by the base station which automatically sends the signal to the map database server, whereby the necessity of maintaining the line in a connected state can be eliminated.

Every time when the user (portable telephone 101) has approached a predetermined point, for example, a branching point such as an intersection, or when a predetermined time has elapsed or when the user has moved by a predetermined distance (step 11), the map database server 106 automatically informs, for example, through a voice, the user (portable telephone 101) of a recommendation route, through which the user (portable telephone 101) is to be traveled, determined based on the positional information and the route information (step 12). Thereafter, for each point, the same operation as described above is repeated to guide the user (portable telephone 101) to the destination (steps 13 and 14).

Finally, as soon as the user (portable telephone 101) arrives at the destination (step 15), the map database server 106 confirms the arrival of the user (portable telephone 101) at the destination based on the positional information and the route information and informs the user (portable telephone 101) of the arrival at the destination. This ends the service (step 16).

Figure 6:
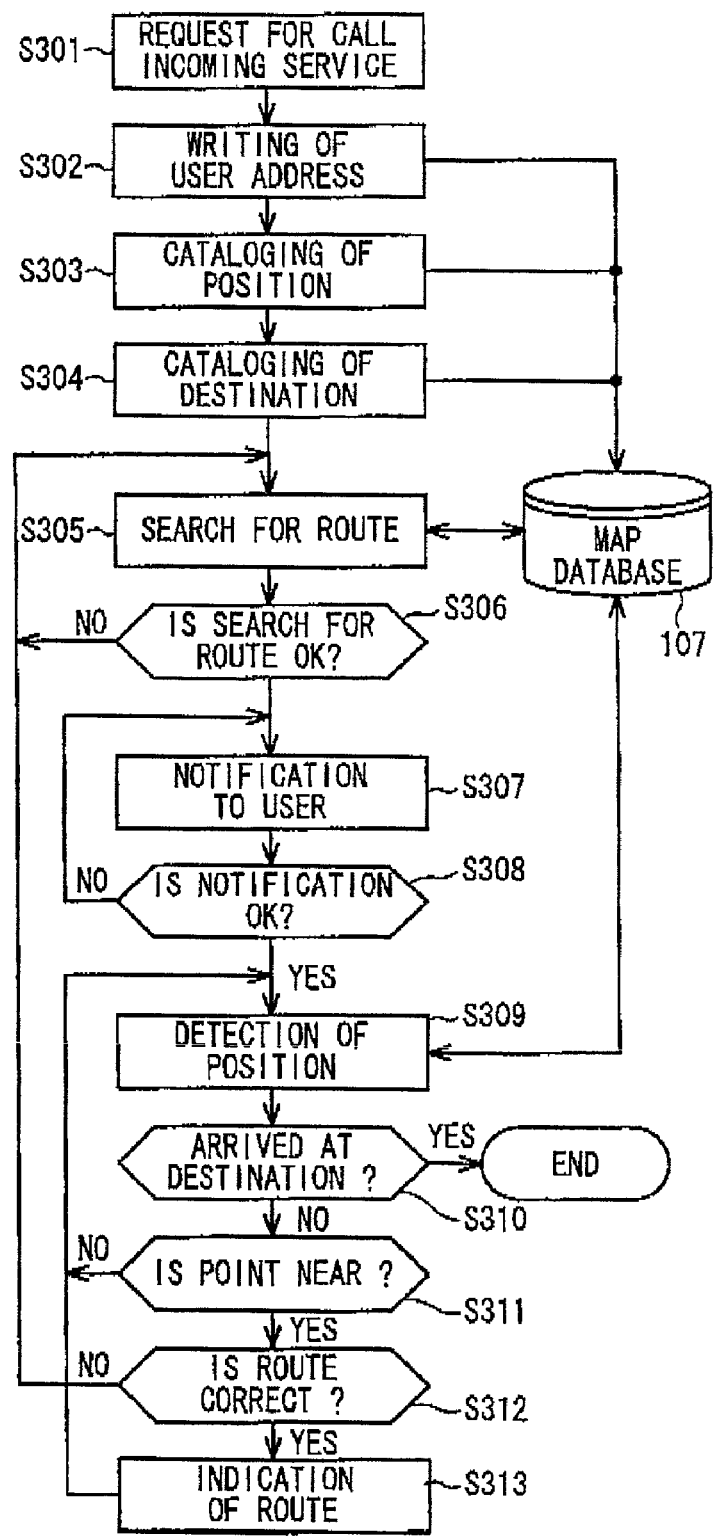
FIG. 6 is a diagram illustrating the operation of a map data server.

FIG. 6 is a flow chart showing the operation of the map database server 106. The operation of the map database server will be explained in more detail with reference to the flow chart.

At the outset, upon access from the user (portable telephone) regarding a request for service through the Internet reading software (step S301), the map database server temporarily records the address number of the user on a medium, for example, a hard disk, within the database server until the simplified navigation system service according to the invention is completed (step S302). Here the purpose of recording the address number of the user (portable telephone) is to automatically send a route indication or the like to the user (portable telephone) during service in the subsequent operation.

Subsequently, positional information (latitude and longitude) is sent from the GPS device built in the portable telephone of the user to the map database server, the map database server records the information and accesses the map database 107 to grasp the current position of the user (portable telephone) (step S303).

Next, the user (portable telephone) sends information on destination in a predetermined format, for example, code number, telephone number of the destination, or address, and the map database server records the received information on the destination (step S304). In addition, the map database server searches the map database 107 for the destinations and, based on the user's (portable telephone) current position and destination, searches the map database 107 for a recommendation route (step S305). The map database server repeatedly searches the map database for a route until the search for a route is completed in step S306. Upon the completion of the search for the route, the map database server informs the user (portable telephone) of the result of the search for the route, for example, through a voice according to step S307 and step S308.

Next, the user (portable telephone) moves according to the route recommended by the map database server. In this case, every time when the user has moved by a predetermined distance or when a predetermined period of time has elapsed, the map database server acquires, from the GPS device built in the user's portable telephone, the positional information and accesses the map database 107 to grasp the current position of the user (portable telephone) (step S309).

The map database server compares the current position of the user (portable telephone) with the destination to judge whether or not the user (portable telephone) has arrived at the destination (step S310). Here when the arrival of the user (portable telephone) at the destination could have been confirmed, the map database server informs the user (portable telephone) of the arrival at the destination, for example, through a voice to end the processing. When the user (portable telephone) has not yet arrived at the destination, the map database server judges whether or not the user (portable telephone) has approached a designated point (step S311). Here the point refers to, for example, a branching point such as an intersection, the case where the user has moved by a predetermined distance, or the case where a predetermined period of time has elapsed, In the step S311, when the result of the judgment is such that the user (portable telephone) does not approach the point, step S309 (detection of position), step S310 (confirmation of arrival at destination), and step S311 (judgment on whether or not the user has approached point) are repeated until the user approaches the point. When the approach of the user (portable telephone) at the point could have been confirmed in step S311, judgment is further carried out, in step S312, on whether or not the current position of the user (portable telephone) has deviated from the recommendation route, When the result of the judgment is such that the current position of the user (portable telephone) has deviated from the recommendation route, the operation is returned to the search for a route in step S305. In this case, the map database server again searches the map database for a recommendation route from the current position of the user (portable telephone) to the destination, and the guide is resumed according to the new route. When the route could have been judged to be proper in step S312, the map database server informs, in step S313, the user (portable telephone) of a next travel route, for example, through a voice. Thereafter, the processing is again returned to step S309, and the operation of the detection of position (step S309), the confirmation of arrival at the destination (step S310), the judgment on whether or not the user (portable telephone) has approached the point (step S311), and the judgment on whether or not the route is proper (step S312) is repeated.

Finally, when the arrival of the user (portable telephone) at the destination could have been confirmed in step S310, the map database server 106 informs the user (portable telephone) of the arrival at the destination, and this ends the guide.

The map data is updated by a map database administrator at occasion demands or periodically.

As described above, the first preferred embodiment of the invention has the following effects.

Firstly, since the navigation system can be simply utilized only by a mobile terminal such as a portable telephone advantageously, there is no need to provide, within a car, a car navigation device which is high in price, requires an installation space, and further has large power consumption.

Secondly, the map data utilized by the mobile terminal are data recorded in the map database server on the Internet. Therefore, each mobile terminal is not required to have map data. Further, the necessity of updating map information in each mobile terminal can be advantageously eliminated.

Thirdly, since the map information is periodically updated by the map database server administrator, advantageously, the user can always utilize the latest information.

Fourthly, only when the mobile terminal has approached a predetermined point, a route is automatically sent to the mobile terminal to guide the user according to the route. Therefore, there is no need to maintain the line in the connected state. Further, advantageously, the payment of wasteful communication charge can be avoided, and ordinary telephone conversation is not disturbed.

(Second Preferred Embodiment)

Figure 7:
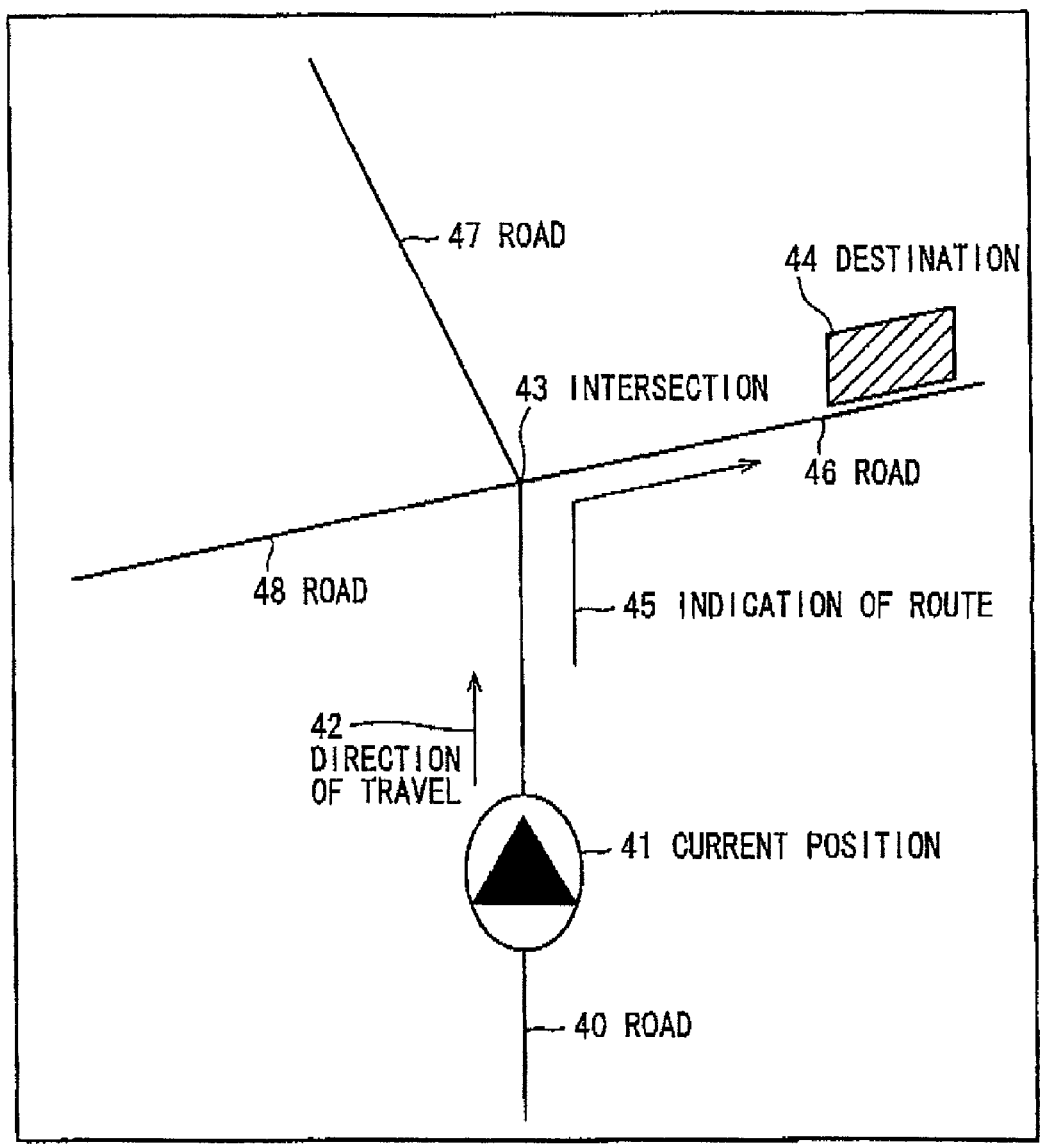
FIG. 7 is a diagram showing a second preferred embodiment of the invention.

FIG. 7 shows a second preferred embodiment of the invention. The construction of the second preferred embodiment is basically the same as that of the first preferred embodiment, except that, in the notification of route information (8, 12, 14) and the notification of arrival (16) in FIG. 5 and the notification of recommended route indication in step S307 and step S313 in FIG. 6, instead of or in addition to the notification by the voice, simplified map data is sent, and simplified map is indicated on the display of the mobile terminal.

For example, when the user (portable terminal) moves (or walks) on a road 40 from a current position 41 of the mobile terminal in a traveling direction 42, there is an intersection 43 at which roads 40, 46, 47, 48 meet. In order to advance toward a destination 44, the user should turn to the right at the intersection 43 and should move along the road 46. Indication 45 of this route is displayed on the mobile terminal.

In this preferred embodiment, in addition to the notification through a voice, the position of the user, the position of the destination, and the route indication are displayed in terms of the simplified map. Therefore, making mistakes, for example, in selecting the intersection at which the user should turn can be avoided, and the user can surely arrive at the destination.

(Third Preferred Embodiment)

Next, the third preferred embodiment of the invention will be explained. The construction of the third preferred embodiment is basically the same as the first preferred embodiment, except that, in the notification of route information (8, 12, 14) and the notification of arrival (16) in FIG. 5 and the notification of recommended route indication in step S307 and step S313 in FIG. 6, in addition to the notification through the voice and the simplified map data, for example, travel data (such as travel distance, travel time, and average speed) and information around the current position of the user (mobile terminal) (for example, information on town such as stores and institutions) are sent. In this preferred embodiment, regarding the travel data, the map database serve calculates the travel distance, travel time, average speed, etc. based on travel history of the user recorded in the map database. Further, information around the current position of the user is stored in the map database and is read as occasion demands. Further, when address (URL) or link destination of other databases, home pages and the like possessing information around the current position is displayed, the user can easily access other databases, home pages and the like to learn various information around the current position.

According to this preferred embodiment, not only the notification by a voice and the provision of a simplified map but also travel data and information around the current position can be acquired by the user, Therefore, a function as a mere navigation system, as well as a function as an advanced information terminal can be provided. More specifically, the user can acquire various information around the current position on a real-time basis, and, thus, the invention can exactly meet diversified needs of users.

(Fourth Preferred Embodiment)

The fourth preferred embodiment of the invention will be explained. The construction of the fourth preferred embodiment is basically the same as that of the above preferred embodiments, except that a plurality of users can simultaneously utilize the system according to this preferred embodiment. This preferred embodiment can be realized by constructing the system in such a manner that other users can access the result of the detection of position of a certain user recorded in the map database.

Figure 8:
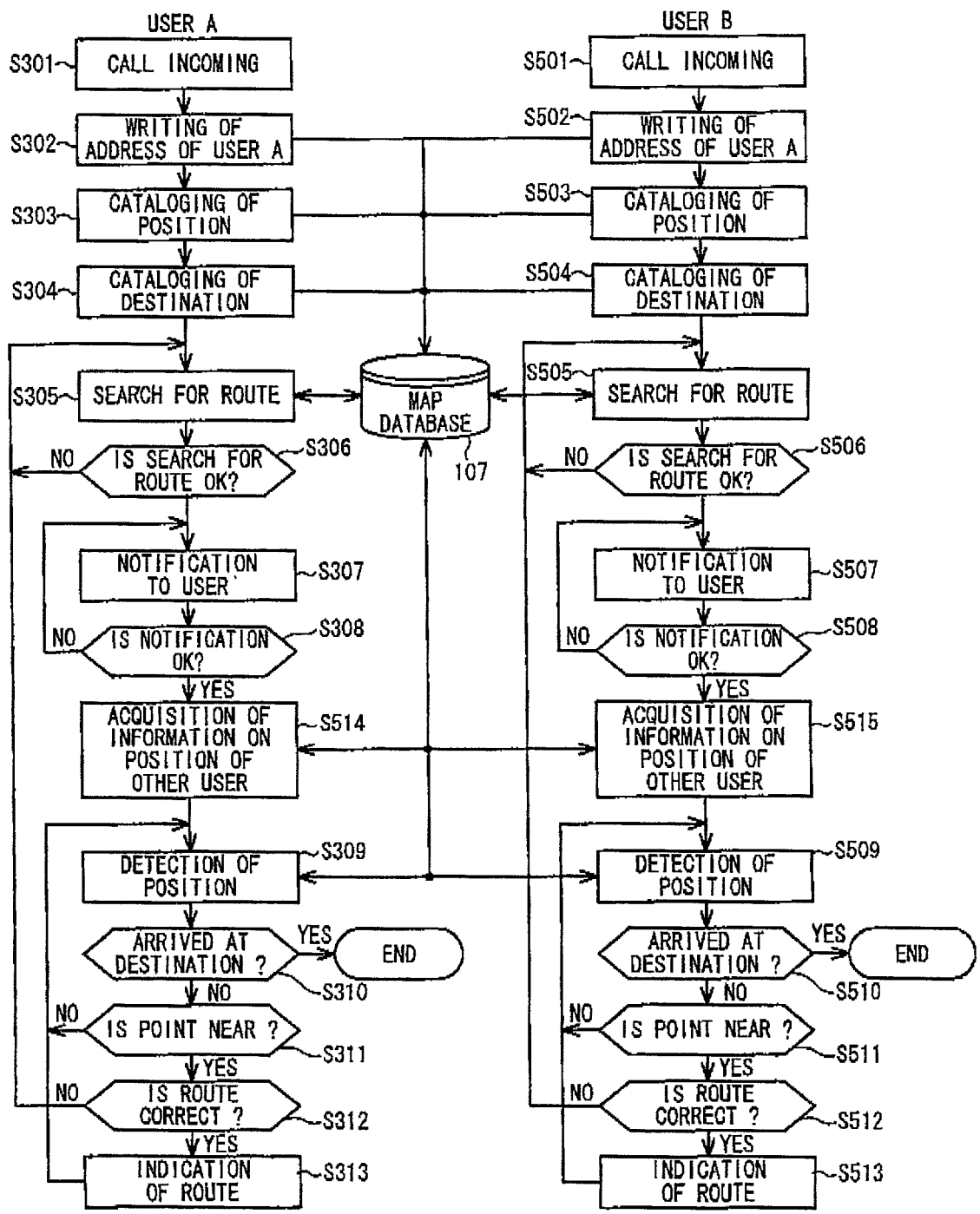
FIG. 8 is a diagram showing a fourth preferred embodiment of the invention.

FIG. 8 is a flow chart showing the fourth preferred embodiment. In FIG. 8, the contents of processing in steps S301 to S313 for user A are the same as the contents of processing in steps S501 to S513 for user B, and the operation and function thereof are the same as those explained above in connection with FIG. 6 showing the first preferred embodiment. Therefore, the explanation of the contents of processing in these steps and the operation and function thereof will be omitted. For users A and B, step S514 and step S515 for acquiring the positional information of other user are additionally provided.

For example, when user A, who accessed this system, wishes to learn the current position of another user who is in use of this system, i.e., user B, in step S514, user A inputs the cataloged address of user B. Based on the address, the map database server searches the map database for the positional information of user B. Thereafter, the map database server asks user B about whether or not the information may be given to user A. When the answer of user B sent to the map database server is that the positional information of user B may be given to user A, the positional information of user B is sent from the map database server to user A, whereby user A can acquire the positional information of user B. On the other hand, when user B has rejected the transmission of the positional information of user B, the map database server informs user A of that effect and, in this case, the positional information of user B is not sent to user A.

Likewise, when user B wishes to learn the positional information of user A, step S515 performs the same processing as step S514, whereby user B can acquire the positional information of user A.

Figure 9:
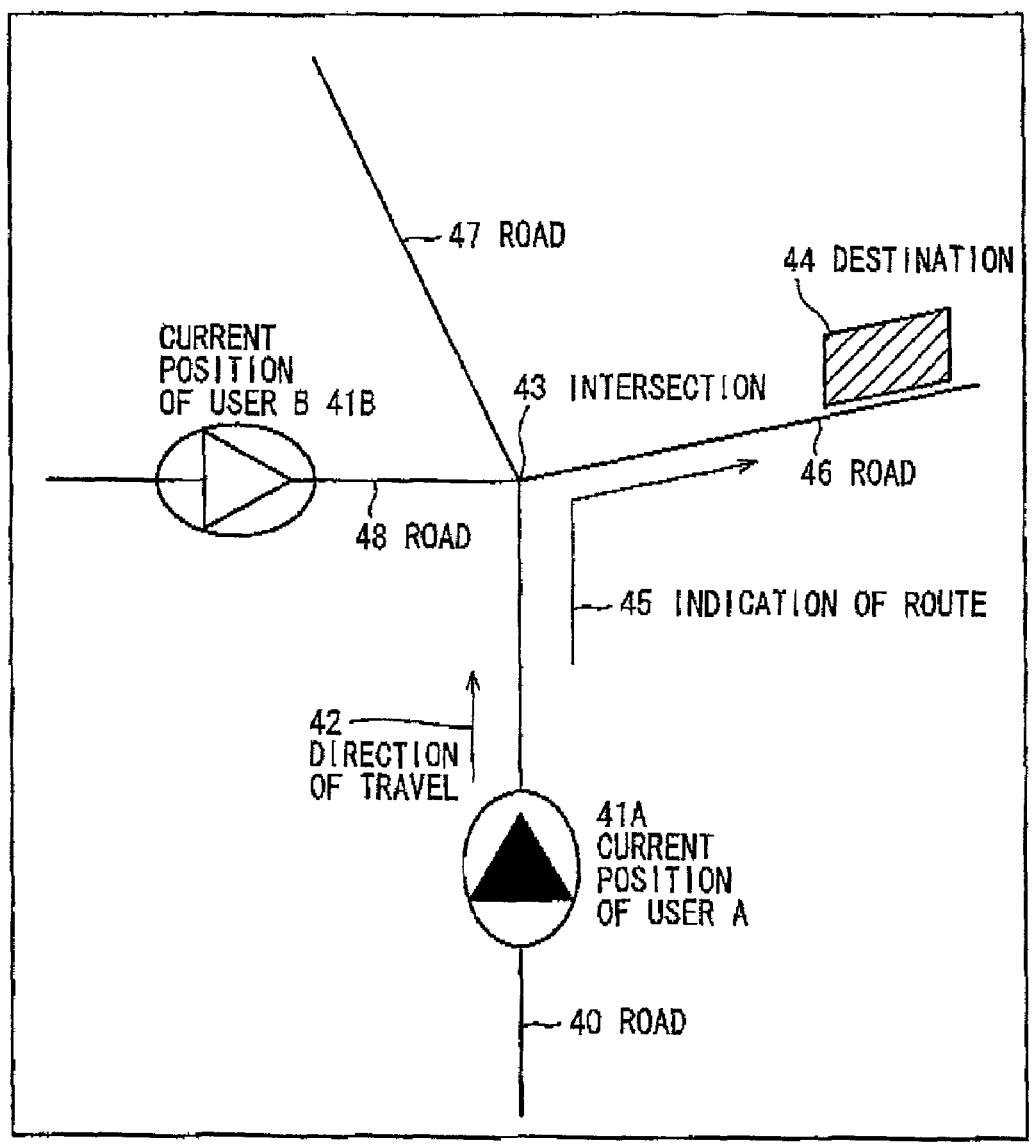
FIG. 9 is a diagram showing a preferred embodiment of a simplified map in the fourth preferred embodiment of the invention.

FIG. 9 shows an embodiment of a simplified map on which information is given to user A in this preferred embodiment. In this case, the position 41A of user A and the position 41B of user B are simultaneously and discriminately displayed. The other reference characters are identical to those used in FIG. 7.

In this preferred embodiment, in addition to the user's own positional information and the positional information of another or other users can be simultaneously displayed on the simplified map. This is convenient for use, for example, at the time of waiting for a friend(s) or the like, As described above, according to the invention, the use of only a portable telephone, which is low in price, can save space, and has low power consumption, suffices for enjoying the service of a navigation system. Therefore, the user can utilize the map data during movement by a car, as well as during the utilization of other transportation facilities or during walking.

Further, the map data, which users utilize, is one which is recorded in the map database server and is periodically updated by the map database server administrator, This can advantageously eliminate the need for each mobile terminal to possess map data and further can eliminate the need to update map information in each mobile terminal.

Only when the mobile terminal has approached a predetermined point, a route is automatically sent to the mobile terminal to guide the user according to the route. Therefore, there is no need to maintain the line in the connected state, and, thus, the payment of wasteful communication charge can be avoided. Further, advantageously, ordinary telephone conversation is not disturbed.

Regarding route indication and the like, in addition to notification through a voice, for example, the position of the user and the position of the destination can be displayed in the form of a simplified map. Therefore, advantageously, the user can more easily and more accurately arrive at the destination.

Further, the user can acquire not only notification through a voice and a simplified map but also travel data and information around the current position and thus can acquire various information around the current position on a real-time basis. Therefore, advantageously, diversified needs of users can be exactly met.

Furthermore, the user's own positional information and the positional information of another or other users can be simultaneously displayed on a simplified map. This is convenient for use, for example, at the time of waiting for a friend(s) or the like.

The invention has been described in detail with particular reference to preferred embodiments, but it will be understood that variations and modifications can be effected within the scope of the invention as set forth in the appended claims.

What is claimed is:

1. A navigation system using plural mobile terminals each held by a movable body such as a person ridden in a vehicle or a walker, map data stored in a server on the Internet being loaded into a first one of the mobile terminals to display a moving route of each movable body on the first mobile terminal, said navigation system comprising:
   a first memory provided in the first mobile terminal, for storing the loaded map data of the server;
   a display provided in the first mobile terminal, for displaying the map data, stored in the first memory, in the form of a voice and/or an image;
   a first control unit provided in the first mobile terminal, for sending the identification number, current position, and destination of a first movable body to the server;
   a second memory provided in the server, for storing the map data; and
   a second control unit provided in the server, for, upon the input of the identification number, the current position, and the destination of the first movable body through the first control unit, reading map data containing the current position and the destination from the second memory and, based on the identification number, sending the map data to the first mobile terminal, said second control unit sending positional information regarding a second mobile terminal to the first mobile terminal when the first mobile unit requests said positional information.

2. The navigation system according to claim 1, wherein Internet reading means is built in the first mobile terminal and the first mobile terminal utilizes the Internet reading means to indicate the map data, sent from the server, on the display.

3. The navigation system according to claim 1, wherein the first mobile terminal acquires information on the current position through a GPS (global positioning system) receiver and sends the information on the current position from the first control unit to the server every time when a predetermined period of time has elapsed or every time when the first mobile terminal has moved by a predetermined distance.

4. The navigation system according to claim 1, wherein, upon the receipt of a request for search for a route from the first mobile terminal, the server makes a search for a recommendation route from the current position to the destination and stores the map data, which has been found as the result of the search, in the second memory through the second control unit and further sends the map data to the first mobile terminal.

5. The navigation system according to claim 4, wherein, upon the receipt of information on the current position from the first mobile terminal every time when a predetermined period of time has elapsed or every time when the first mobile terminal has moved by a predetermined distance, the server compares, through the second control unit, the current position with the positions of the first mobile terminal stored in the second memory for each predetermined time or each predetermined distance and, as a result, when the route of the first mobile terminal has been found to be in the state of deviation from the recommendation route stored in the second memory, the server makes again a search for a recommendation route from the current position to the destination, stores the map data in the second memory through the second control unit and further sends the map data to the first mobile terminal.

6. The navigation system according to claim 1, wherein, upon the receipt of information on the current position from the first mobile terminal every time when a predetermined period of time has elapsed or every time when the first mobile terminal has moved by a predetermined distance, the server compares, through the second control unit, the current position with the position of the first mobile terminal stored in the second memory for each predetermined time or each predetermined distance to judge whether or not the first mobile terminal has moved according to the recommendation route stored in the second memory and, every time when the first mobile terminal has arrived at a predetermined point, sends map data containing a route, through which the first mobile terminal is to be traveled, from the second control unit to the first mobile terminal.

7. The navigation system according to claim 6, wherein the predetermined point is the time when the first mobile terminal has approached a branching point such as an intersection or a junction of three roads, the time when the first mobile terminal has moved by a predetermined period of time, or the time when the first mobile terminal has moved by a predetermined distance.

8. The navigation system according to claim 1, wherein, upon the receipt of information on the current position from the first mobile terminal every time when a predetermined period of time has elapsed or every time when the first mobile terminal has moved by a predetermined distance, the server compares, through the second control unit, the current position with the position of the destination stored in the second memory for each predetermined time or each predetermined distance and, when the current position corresponds to the position of the destination stored in the second memory, the server informs the first mobile terminal of the arrival of the first mobile terminal at the destination stored in the second memory through a voice, an image, or both a voice and an image.

9. The navigation system according to claim 1, wherein, upon the receipt of information on the current position from the first mobile terminal every time when a predetermined period of time has elapsed or every time when the first mobile terminal has moved by a predetermined distance, the server compares, through the second control unit, the current position with the original position or predetermined position of the first mobile terminal stored in the second memory for each predetermined time or each predetermined distance, calculates travel information such as the time required in travel, the travel distance, and the average speed between the original position or the predetermined position, stored in the second memory, and the current position, stores the travel information in the second memory, and further sends map data, containing an area ranging from the original position or the predetermined position to the destination, to the first mobile terminal.

10. The navigation system according to claim 1, wherein the map data in the server contains information on town including stores and institutions around the current position.

11. The navigation system according to claim 10, wherein the town information is obtained by displaying a predetermined link destination on the display of the first mobile terminal and selecting the link destination or by inputting a predetermined address through key operation to connect the first mobile terminal to a database server or a home page other than the server connected to the Internet.

12. The navigation system according to claim 1, wherein the map data sent from the second control unit to the first mobile terminal comprises a voice, an image, or both a voice and an image.

13. The navigation system according to claim 1, wherein the server periodically updates the map data stored in the second memory.

14. A navigation system using a mobile terminal held by a movable body such as a person riding in a vehicle or a walker, map data stored in a server on the Internet being loaded into a mobile terminal to display a moving route of movable body on the mobile terminal, said navigation system comprising:
a first memory provided in the mobile terminal, for storing the loaded map data of the server;
a display provided in the mobile terminal, for displaying the map data, stored in the first memory, in the form of a voice and/or an image;
a first control unit provided in the mobile terminal, for sending the identification number, current position, and destination of the movable body to the server;
a second memory provided in the server, for storing the map data; and
a second control unit provided in the server, for, upon the input of the identification number, the current position, and the destination of the movable body through the first control unit, reading map data containing the current position and the destination from the second memory and, based on the identification number, sending the map data to the mobile terminal;
wherein, upon the receipt of a request from the mobile terminal as a first mobile terminal for the display of the position of another mobile terminal as a second mobile terminal in the map data being currently displayed, the server searches the second memory for the positional information of the second mobile terminal, and, when information on the second mobile terminal has been found to be stored in the second memory, the server informs the second mobile terminal of that the first mobile terminal has requested the display of the position of the second mobile terminal in the map data being currently displayed and, upon the receipt of the permission to display the position of the second mobile terminal, the server reads, from the second memory, map data comprising positional data of the second mobile terminal added to the map data being currently indicated on the display of the first mobile terminal, sends the read map data to the first mobile terminal, and, in addition, sends to the second mobile terminal, the same map data as sent to the first mobile terminal through the second control unit of the server.

* * * * *